May 18, 1965 W. J. UREN ETAL 3,184,734

DIGITAL-TO-ANALOG CONVERTER

Original Filed Feb. 28, 1961

INVENTORS.
WILLIAM J. UREN,
C. H. PROPSTER JR.
BY A. M. Fernandez
ATTORNEY.

United States Patent Office 3,184,734
Patented May 18, 1965

3,184,734
DIGITAL-TO-ANALOG CONVERTER

William J. Uren, Phoenix, Ariz., and Charles H. Propster, Jr., San Jose, Calif., assignors to General Electric Company, a corporation of New York Continuation of application Ser. No. 92,234, Feb. 28, 1961. This application June 25, 1962, Ser. No. 206,131
10 Claims. (Cl. 340—347)

Figures 1, 2:
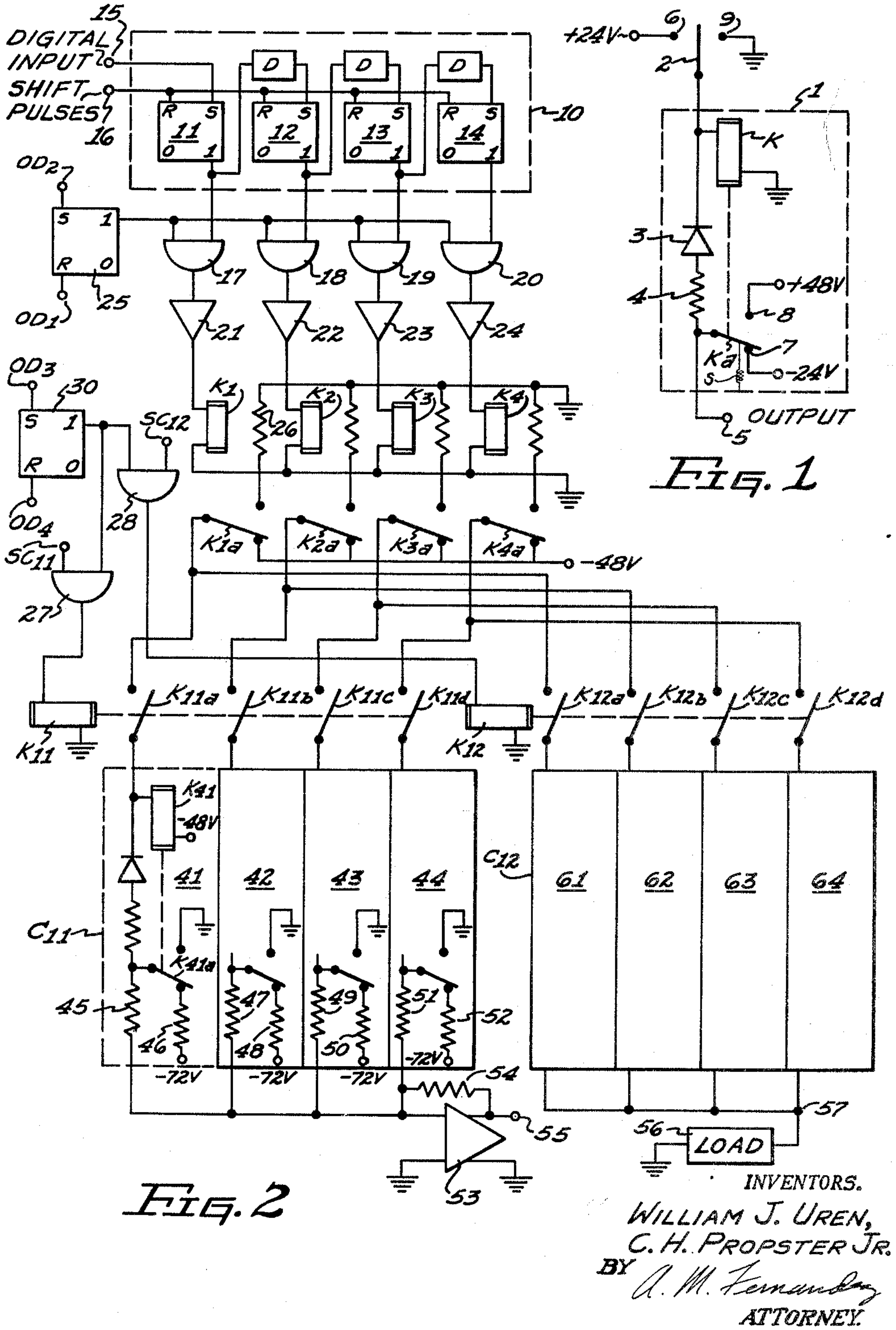

This application is a continuation of our pending application, Serial No. 92,234, filed February 28, 1961, now forfeited.

This invention pertains to a bistable relay circuit particularly adapted for use in systems for converting a coded group of digital signals representing a number into an analog signal, the amplitude of which is proportional to the number and is retained until another coded group of digital signals representing a different number is received for conversion.

In numerous applications, especially in industrial process control applications, it is desirable to compute or otherwise provide control signals in digital form, particularly when several independent and accurate control signals are to be repeatedly provided under specified conditions. Each group of digital control signals is converted into an analog signal and continuously applied to a load until a different group is computed or otherwise provided.

A typical digital-to-analog converter is provided with a plurality of current generators, one generator for each denominational order represented by a digital signal of the number to be converted to produce a current having an amplitude proportional to its order, and a like number of control switches each responsive to an associated digital signal order for connecting a corresponding current generator to a current adder. Thus, one channel consisting of a control switch and a current generator is connected to the current adder for each digital signal of a group representing a number. For instance, a converter for a four-digit binary number is provided with four channels. The digital signals are assigned the decimal values $2^3$, $2^2$, $2^1$, and $2^0$ according to their respective order in the binary number.

The current generators are designed to produce currents having amplitudes proportional to the values of the digit orders of a coded group of digital signals with which they are associated. Accordingly, the full scale analog signal output of a four-digit binary number converter is fifteen units and can be varied only by increments of $\frac{1}{15}$ of its full scale output. Smaller increments, and therefore larger binary numbers, are required for many applications such as nine-digit binary numbers representing decimal numbers from 0 to 511 which may be converted into analog signals that vary by increments of $\frac{1}{511}$ of the full scale output or ten-digit binary numbers representing decimal numbers from 0 to 1023 which may be converted into analog signals that vary by $\frac{1}{1023}$ of the full scale output. Digital computers are generally designed to provide numbers having twenty binary digits or more, but providing more digits in order to allow for changing the analog signal output by smaller increments requires adding more channels to the converter which may be very expensive if the cost of a single channel is high. The cost of expanding the scale of a digital-to-analog converter is further increased by the cost of the larger static register required to store the binary number while it is being converted.

Unless the static register is disconnected from the converter while a new binary number is being entered, the analog control signal transmitted by the converter will fluctuate radically and cause the transition period between analog signals to be increased. If the static register is disconnected from the converter while a new binary number is being entered, it is customary to provide a memory device in each channel of the converter to store the digits of the previous number until the new number has been entered, which further adds to the cost of a digital-to-analog converter.

Another desired characteristic of digital-to-analog converters employed in industrial process control systems is that a common register be employed to distribute binary numbers to a plurality of converters, either at random or in a cyclic manner. In order to accomplish that, each converter must be provided with some memory, such as a group of buffer flip-flops, to store a binary number until a new number is distributed through the common register; but to provide a group of buffer flip-flops for each converter would be almost as expensive as to provide a separate distributing register for each converter.

A relay is commonly employed to implement the switch required in each channel of a converter to connect an associated current generator to the common current adder. When a relay is employed for that purpose, a second transfer contact may be provided to hold the relay energized and thereby provide a memory for the associated digital signal. However, the provision of a second transfer contact for each relay is also expensive, particularly when mercury-wetted relays must be employed to provide extremely good reliability over a long period of operation.

Accordingly, an object of the invention is to provide an improved and inexpensive digital-to-analog converting system.

Another object of the invention is to provide an inexpensive bistable relay circuit which may be particularly adapted for use in a digital-to-analog converter system.

These and other objects are realized in one embodiment of the invention by providing a plurality of channels, one for each digit of a number to be converted into an analog signal, each channel comprising a bistable relay circuit responsive to an associated digital signal assigned a different order of value to effectively connect a weighted current source to an analog summing circuit. Each weighted current source includes a resistor connected to a common summing amplifier or circuit and has a resistance that is proportional to the order of the associated digital signal. When a digital signal is momentarily applied to the bistable relay circuit of a given channel, a relay is energized, thereby causing its transfer contact to be switched from a first contact connected to a first source of potential to a second contact connected to a second source of potential. As the transfer contact switches from the first contact to the second, the current to the summing amplifier or circuit through a weighted resistor is interrupted and the weighted resistor is reconnected from the summing amplifier or circuit to a source of reference potential which is ground, thereby altering the analog signal transmitted from the adder to a load by a discrete amount which is proportional to the order of the digital input signal to the bistable relay circuit.

The bistable relay circuit comprises one relay and a unidirectional current-conducting device provided to connect the transfer contact of the energized relay to the control input terminal of the relay coil so that as the transfer contact switches from a first contact to a second, a potential is applied to the coil to provide a holding current after the input digital signal, having a value zero in the present embodiment, passes. In that manner, the second contact of the relay is employed in a novel manner to provide an analog conversion of a digital signal and to provide a bistable relay circuit to store the digital signal being converted.

When a different digital signal representing a digit having a weighted value is to be entered in a given channel for conversion following a digit having a value of zero, the new digital signal momentarily applies a voltage to the input terminal of the coil at the same potential as the potential source connected at the second terminal of the coil, thereby effectively providing a short circuit having virtually no impedance across the relay coil in order that it may be de-energized. The transfer contact returns to the first contact when the relay is de-energized due to a spring bias. In that manner, the bistable relay circuits in a group of channels may be employed to convert a group of digital signals representing a number into an analog signal and to also store the digital code configuration of the number until a new number is to be converted, thereby making it possible to employ one register to distribute binary numbers to a plurality of converters.

Other objects and inventions will become apparent from the following description with reference to the drawings in which FIG. 1 is a schematic diagram of a novel bistable relay circuit and FIG. 2 is a schematic diagram of an improved digital-to-analog converting system employing the novel bistable relay circuit schematically illustrated in FIG. 1.

In describing the operation of the novel bistable relay circuit 1 schematically illustrated in FIG. 1, it is assumed that a manual switch 2 is connected to a first terminal of the coil of a relay K, the first terminal of the coil being the input terminal of the bistable relay circuit 1, and that the relay is initially de-energized while the switch 2 is in a neutral position as shown. With the relay K de-energized, a diode 3 is reverse biased by −24 volts applied to its anode through a resistor 4 and a transfer contact $K_a$ of the relay K. An output terminal 5 of the bistable relay circuit 1 connected to the transfer contact $K_a$ is then at −24 volts as long as the relay K remains de-energized.

When the switch 2 is momentarily closed on a contact 6 connected to a source of +24 volts, the relay is energized and the transfer contact is thereby moved from a first contact 7 connected to a source of −24 volts to a second contact 8 connected to a source of +48 volts. The diode 3 is then forward biased so that after the switch 2 is returned to its neutral position, it will conduct current from the source of +48 volts to a source of reference potential to which a second terminal of the relay is connected. For the purpose of this description it is assumed that the relay K is designed to operate with a twenty-four volt energizing signal so that if a +48 volt source is connected to the second contact 8, the resistance of the conducting diode 3 and resistor 4 in series should be approximately equal to the resistance of the relay coil. The holding current provided through the diode 3 establishes a second stable condition for the relay circuit 1, a condition in which the output terminal 5 is maintained at +48 volts.

To reset the relay circuit 1 to its first stable condition, the manual switch 2 is momentarily closed on a contact 9 connected to the source of reference potential. The relay K is thereby de-energized and the transfer contact $K_a$ is returned to the first contact 7 under the influence of a biasing spring S which may be an integral part of the transfer contact $K_a$. After the relay K is de-energized, the diode 3 is again reverse biased and remains reverse biased after the switch 2 is returned to its neutral position due to the −24 volts applied to its anode through the transfer contact $K_a$.

The manner in which this novel bistable relay circuit is employed to provide a new and improved digital-to-analog converting system is illustrated in FIG. 2. A coded group of digital signals is received in parallel and tempararily stored in a static register 10 until it is transferred to a converter $C_{11}$ or $C_{12}$ which stores and converts the digital signals until a new group of digital signals is transferred to it from the register 10.

The static register 10 provided to transmit a group of coded digital signals in parallel to a digital-to-analog converter is represented in FIG. 2 to be of a type described by Jacob Millman and Herbert Taub at pages 412 and 413 in Pulse and Digital Circuits, published by McGraw-Hill Book Company in 1958, but it should be understood that registers of other configurations may be employed, such as shift registers employing logic gates for serial transfer between stages. For convenience, a four-stage shift register has been illustrated but as many stages may be provided as are required by the application of this invention, one stage for each digital signal of a group representing a number that is to be converted.

A group of digital signals applied serially to an input terminal 15 is shifted into the register 10 in response to shift pulses which are applied to a terminal 16 until the least significant digit is registered in the flip-flop 14 of the last stage. The most significant digit is then registered in the flip-flop 11 of the first stage. For the purpose of illustrating an embodiment of the invention, it is assumed that the code of the group of digital signals is the standard (8–4–2–1) binary code, but other codes may obviously be employed, such as the reflected (Gray) binary code or some binary-decimal code with only minor changes in the design of the weighting resistors employed.

A group of AND-gates 17 to 20 are enabled to transmit the binary number in parallel from the register 10 to a group of amplifiers 21 to 24 while a flip-flop 25 is set. Each of the amplifiers 21 to 24 may be a grounded-emitter NPN transistor switch of the type illustrated by Millman and Taub, supra, at page 588 and is employed so that when its associated one of the AND-gates 17 to 20 is enabled by coincident positive signals, it is conducting at saturation and its output terminal is clamped to ground. Under those circumstances, an associated one of a group of relays $K_1$ to $K_4$ is de-energized and its transfer contact is thereby placed in the position shown.

Each of the AND-gates 17 to 20 may be a diode coincident circuit of the type illustrated by Millman and Taub, supra, at page 398. Each of the flip-flops, such as the flip-flop 25, may be of the type illustrated by Millman and Taub, supra, at page 595 and so employed that its true output terminal is at a positive potential only when it is set. When the flip-flop 25 is set, only those AND-gates associated with flip-flops 11 to 14 of stages in the register 10 which are set to store a binary digit 1 produce a positive signal to enable associated amplifiers to transmit a 0 volt signal and de-energize their associated relays. For instance, when a binary digit 1 is stored in the least significant position, the flip-flop 14 is set and the AND-gate 20 is enabled upon the flip-flop 25 also being set. The positive output signal from the enabled AND-gate 20 switches the amplifier 24 on and de-energizes the relay $K_4$ so that its transfer contact is placed in the position shown.

As a further example, assume that a binary digit 0 is stored in the most significant position of the register so that the flip-flop 11 transmits a 0 volt signal. Under those circumstances, the AND-gate 17 is not enabled when the flip-flop 25 is set and the associated amplifier 21 remains cut off. As long as the amplifier 21 remains cut off, its associated relay $K_1$ remains energized and its transfer contact $K_{1a}$ is connected to ground by a current-limiting resistor 26. Accordingly, an energized relay transmits a digital signal of 0 volt representing a binary digit 0 and a de-energized relay transmits a digital signal of −48 volts representing a binary digit 1.

After a group of digital signals representing a binary number has been stored in the register 10 and the relays $K_1$ to $K_4$ have been energized in accordance with the digital configuration of the binary number, the number may be converted into an analog signal by a selected one of a plurality of converters $C_{11}$ and $C_{12}$. That is accomplished by enabling one of a plurality of associated AND-gates 27 and 28. Assuming that the digital-to-analog converter $C_{11}$ is to be selected, a positive selecting signal is applied to an input terminal $SC_{11}$ of the AND-gate 27 and a flip-flop 30 is set. The enabled AND-gate 27 transmits a positive signal to cause a relay $K_{11}$ to be energized and its transfer contacts $K_{11a}$ to $K_{11d}$ to be closed.

The transfer contacts $K_{11a}$ to $K_{11d}$ connect the transfer contacts $K_{1a}$ to $K_{4a}$ to respective bistable relay circuits 41 to 44, each of which is similar to the bistable relay circuit described with reference to FIG. 1, the only differences being the addition of weighting resistors, such as resistors 45 and 46 in the bistable relay circuit 41, and a change in the applied voltages. In FIG. 1 the reference potential connected to the second terminal of the relay K is illustrated as ground, whereas the corresponding reference potential in the bistable relay circuit 41 is −48 volts. All other voltages applied to the bistable relay circuit 41 are approximately forty-eight volts more negative than the corresponding voltages applied to the bistable relay circuit of FIG. 1. The current-limiting resistor associated with each relay $K_1$ to $K_4$, such as the resistor 26, is selected to have a resistance approximately equal to one-third of the resistance of the relay of the associated one of the bistable relay circuits 41 to 44, such as the relay $K_{41}$, in order that its resistance and the resistance of the two transfer contacts which connect it to an input terminal of a bistable relay circuit will function to provide a voltage of approximately −24 volts when those transfer contacts are closed, the deviation from −24 volts permissible being a function only of the construction of the relays employed in the bistable relay circuits.

Assuming that the group of digital signals stored in the register 10 represents a binary number 0111, only the relay $K_1$ is energized when the relay $K_{11}$ is selectively energized and only the bistable relay circuit 41 is energized. The energizing current for the relay circuit 41 is supplied from ground through a series circuit consisting of the resistor 26, the transfer contact $K_{1a}$ and the transfer contact $K_{11a}$.

After the appropriate bistable relay circuits 41 to 44 have been energized, the relay $K_{11}$ is de-energized by resetting the flip-flop 30. The energized relay circuits, such as the relay circuit 41 in the present example, remain energized due to the novel manner in which a holding current is provided as described with reference to FIG. 1.

While the bistable relay circuit 41 is energized, its transfer contact $K_{41a}$ connects the weighting resistor 45 to ground, thereby providing zero current to a load 53 in response to a binary digit zero. Since the remaining bistable relay circuits 42 to 44 remain de-energized for the digital-to-analog conversion of the binary number 0111, the transfer contact in each connects a source of −72 volts to the load through pairs of resistors 47, 48; 49, 50; and 51, 52. Each resistor of a pair connected in series by an associated transfer contact is weighted in inverse proportion to the order of the binary digit with which it is associated in order that the pair in series may provide an inversely weighted current to the load 53, the amplitude of which is directly proportional to the binary digit being converted. The following table is a specific example of one set of weighted resistors for converting a four-digit binary number:

| Weight | 8 | | 4 | | 2 | | 1 | |
|---|---|---|---|---|---|---|---|---|
| Circuit | 41 | | 42 | | 43 | | 44 | |
| Resistor | 45 | 46 | 47 | 48 | 49 | 50 | 51 | 52 |
| Resistance | 24K | 1K | 48K | 2K | 96K | 4K | 192K | 8K |
| Resistance of pairs in series. | 25K | | 50K | | 100K | | 200K | |

The load circuit is illustrated as a summing amplifier 53 having a negative feedback resistor 54 the resistance of which is substantially equal to the sum of the resistances of the resistors 51 and 52 which in the foregoing table is $200 \times 10^3$ ohms. The sum of the resistances of the resistors 49 and 50 is substantially equal to ½ of the resistance of the resistor 54 and the proportions for the resistors in the bistable circuits 41 and 42 and ⅛ and ¼, respectively, as in the example illustrated by the foregoing table. This manner of weighting the resistors for each order of a binary number, or a number expressed in any other digital code, is standard practice in designing digital-to-analog converters.

Each relay employed in the bistable relay circuits 41 to 44 is preferably of the mercury-wetted contact type, as are the relays $K_1$ to $K_4$, which makes a connection between its transfer contact and its second contact before it breaks a connection between its transfer contact and its first contact. For that reason, the weighted resistance associated with a given bistable relay circuit is divided, a fraction being connected between the source of −72 volts and the first contact to limit current just as the resistor 26 limits current for the relay $K_1$; otherwise, the transfer contact would provide a short circuit between the source of −72 volts and ground while the bistable circuit connection is being transferred from one contact to the other.

The summing amplifier 53 may be of a conventional type generally described by G. A. Korn and T. M. Korn at pages 13 and 14 of Electronic Analog Computers, published by McGraw-Hill Book Company in 1952. The output signal provided at an output terminal 55 is a voltage signal proportional to the sum of the weighted input currents. A summing circuit may also be employed as described at pages 12 and 13 by Korn and Korn, supra, to obtain a voltage signal which is proportional to the sum of the weighted input currents and the load may form a part of the summing circuit as illustrated by the load 56 connected at a junction 57 to a plurality of bistable relay circuits 61 to 64 in the converter $C_{12}$. Since the sum of all currents flowing to the junction 57 must be zero, the current through the load is equal to the sum of the weighted currents provided by the bistable relay circuits.

After the bistable relay circuits 41 to 44 have been energized in accordance with the configuration of a group of digital signals representing a binary number and the relay $K_{11}$ has been de-energized, as described hereinbefore, the register 10 may be employed to receive another group of digital signals for transfer to either the converter $C_{11}$ or the converter $C_{12}$. The latter may be selected by energizing the relay $K_{12}$ through the AND-gate $SC_{12}$ in a manner similar to that described for the selection of the converter $C_{11}$.

When a new number is to be converted by a previously selected converter, a binary digit 0 in a given order energizes its associated bistable relay circuit, as described hereinbefore, if not already energized, and a binary digit 1 de-energizes its associated bistable relay circuit. For instance, the binary number 1000 transferred to the converter $C_{11}$ following the binary number 0111 would cause the bistable relay circuits 42, 43 and 44 to be energized, just as the bistable relay circuit 41 had been previously energized, and the bistable relay circuit 41 to be de-energized due to a −48 volt signal applied to its input terminal through the transfer contacts $K_{1a}$ and $K_{11a}$.

Four control signals are required in the present embodiment of an improved digital-to-analog converting system to transfer a group of digital signals from the register 10 to a selected digital-to-analog converter as described. The first signal is a pulse applied to an input terminal $OD_1$ of the flip-flop 25 to reset it and thereby disable the AND-gates 17 to 20 while a new group of digital signals are being transferred into the register 10. Thereafter, a pulse is applied to an input terminal $OD_2$ of the flip-flop 25 to set it and enable the AND-gates 17 to 20 to energize the respective relays $K_1$ to $K_4$ in accordance with the configuration of the digital signals in the register 10. After allowing sufficient time for the energized relays $K_1$ to $K_4$ to settle, a pulse is applied to an input terminal $OD_3$ of the flip-flop 30 to set it and thereby enable a selected one of the AND-gates 27 and 28 to transfer the digital signals from the relays $K_1$ to $K_4$ to the bistable relay circuits of the selected converter. Sufficient time is allowed for the relay $K_{11}$ or $K_{12}$ to energize and for the bistable relay circuits of the corresponding converter $C_{11}$ or $C_{12}$ to be set to appropriate stable conditions before the flip-flop 30 is reset by a pulse applied to an input terminal $OD_4$.

The sequencing pulses applied to the control input terminals $OD_1$ to $OD_4$ may be derived from a sequence control pulse distributor of the data processing or industrial control system with which the digital-to-analog converter is associated. A typical sequence control pulse distributor consists of a gated counter driven by synchronizing clock pulses. For the present embodiment, the clock pulses may be approximately four microsecond pulses and the gating logic of the counter so arranged that the control pulses distributed from different stages to the control input terminals $OD_1$ to $OD_4$ allow sufficient time for the relays to energize and de-energize, as required by the characteristics of the relays employed.

The improved and inexpensive digital-to-analog converting system just described utilizes the novel bistable relay circuit illustrated in FIG. 1. Other bistable relay circuits of the type described by Keister et al., at page 29 of The Design of Switching Circuits (Bell Laboratories Series), D. Van Nostrand Co. (1951), lack a unidirectional current-conducting device in the latching circuit so that a given channel of a digital-to-analog converter utilizing such a prior art bistable relay circuit cannot be readily adapted to provide an output signal which may assume two voltage levels because the second or back contact, if present, must be left open; otherwise, the relay would be provided with energizing current for both positions of the transfer contact. It is often desirable to be able to provide an output signal that may assume two voltage levels, as in the improved digital-to-analog converting system of FIG. 2 in which the second voltage level is the reference potential (ground). Moreover, there is an advantage in being able to switch an input terminal of a resistor from a source of potential to ground in a digital attenuating network in that the series impedance between the source of potential and the load may be altered in response to the input digital signals while the output admittance of the network is maintained substantially constant.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A bistable relay circuit comprising:

a relay having a coil with first and second terminals at opposite ends thereof, a spring biased transfer contact and a relay contact away from which said transfer contact is held by its spring bias while said coil is de-energized;

an output terminal;

means for coupling said output terminal to said transfer contact;

a source of reference potential;

means for coupling said source of reference potential to said first terminal of said coil;

a source of potential of a given polarity with reference to said reference potential;

means for coupling said source of potential of a given polarity to said relay contact;

means for momentarily applying a voltage signal of said given polarity to said second terminal of said coil, whereby said coil is energized to cause said transfer contact to close upon said relay contact;

a unidirectional current-conducting means connecting said transfer contact to said second terminal of said coil, said unidirectional current-conducting means being so poled as to conduct current between said transfer contact and said relay contact when said coil is energized, whereby said coil is maintained energized until selectively de-energized;

and means for selectively de-energizing said coil.

2. A bistable relay circuit, comprising:

a relay having a coil and a transfer contact operatively associated with first and second contacts, said transfer contact being spring-biased to make an electrical connection with said first contact when said coil is de-energized;

means for connecting a first terminal of said coil to a source of reference potential;

means for connecting to said first contact a first source of potential of a given polarity with respect to said reference potential;

means for connecting to said second contact a second source of potential of a polarity with respect to said reference potential opposite to that of said given polarity;

an output terminal;

means for coupling said transfer contact to said output terminal;

means for momentarily translating a first voltage signal of a polarity opposite that of said given polarity to a second terminal of said coil, said first voltage signal having sufficient amplitude to cause said coil to be energized;

means for electrically coupling said transfer contact to said second terminal of said coil, said means including a unidirectional current-conducting device so poled as to permit current to flow through it to said coil when said coil is energized by said first signal whereby said coil remains energized after said first signal is translated and to prevent current from flowing through it to said coil when said coil is de-energized, whereby said coil remains de-energized after a digital signal at said reference potential is translated to said second terminal of said coil.

3. A bistable relay circuit, comprising:

a relay having a coil and a transfer contact operatively associated with first and second contacts, said transfer contact being spring-biased to make an electrical connection with said first contact when said coil is de-energized;

means for connecting a first terminal of said coil to a source of reference potential;

means for connecting to said first contact a first source of potential of a given polarity with respect to said reference potential;

means for connecting to said second contact a second source of potential of a polarity with respect to said reference potential opposite to that of said given polarity;

an output terminal;

means for coupling said transfer contact to said output terminal;

means for momentarily translating a first voltage signal of a polarity opposite that of said given polarity to a second terminal of said coil, said first voltage signal having sufficient amplitude to cause said coil to be energized;

means for electrically coupling said transfer contact to said second terminal of said coil, said means including a unidirectional current-conducting device so poled as to permit current to flow through it to said coil when said coil is energized by said first signal whereby said coil remains energized after said first signal is translated;

and means for momentarily translating a second voltage signal to said second terminal of said coil, said second voltage signal being at a substantially zero potential with respect to said source of reference potional whereby said coil is caused to be de-energized.

4. In a system for applying a current to a load, the amplitude of which is specified by a group of coded digital signals, each digital signal in said group being assigned a different order of value and being associated with a different one of a plurality of bistable relay circuits, a given digital signal being operatively associated with a corresponding relay circuit in order that said corresponding relay circuit may be energized when said given digital signal is a voltage signal at a first potential of a given polarity with respect to a reference potential and be de-energized when said given digital signal is a voltage signal at said reference potential, an output terminal of each bistable relay circuit being connected to said load, each of said bistable relay circuits comprising:

a relay having a coil and a transfer contact operatively associated with first and second contacts, said transfer contact being spring-biased to make an electrical connection with said first contact when said coil is de-energized;

means for connecting a first terminal of said coil to a source of reference potential;

means for connecting to said first contact a first source of potential of a polarity opposite to said given polarity with respect to said reference potential;

means for connecting to said second contact a second source of potential of said given polarity;

a resistor for coupling said transfer contact to said output terminal;

means for momentarily translating a digital signal to a second terminal of said coil;

means for electrically coupling said transfer contact to said second terminal of said coil, said means including a unidirectional current-conducting device so poled as to permit current to flow through it to said coil when said coil is energized, whereby said coil remains energized after a digital signal at said first potential is translated to said second terminal of said coil, and to prevent current from flowing through it to said coil when said coil is de-enerized, whereby said coil remains de-energized after a digital signal at said reference potential is translated to said second terminal of said coil.

5. In a switching system for applying a current to a load the amplitude of which is specified by a group of coded digital signals, each digital signal in said group being assigned a different order of value and being associated with a different one of a plurality of bistable relay circuits as defined in claim 4, wherein the resistance of said resistor in each of said given bistable relay circuits is proportional to the order of the digital signal with which it is operatively associated.

6. In a switching system for applying a current to a load the amplitude of which is specified by a group of coded digital signals, each digital signal in said group being assigned a different order of value and being associated with a different one of a plurality of bistable relay circuits as defined in claim 5, wherein each of said bistable relays is connected to a switching means for momentarily translating a group of digital signals in parallel to said bistable relay circuits whereby a group of digital signals representing a number will cause each of said bistable switches to be placed in one of two stable states of energization according to the digital value of its associated digital signal in order to produce a current proportional to said number.

7. In a switching system for applying a current to a load the amplitude of which is specified by a group of coded digital signals, each digital signal in said group being assigned a different order of value and being associated with a different one of a plurality of bistable relay circuits as defined in claim 6 wherein each of said bistable relays is connected to said switching means, and wherein said switching means is coupled to a register, and including a means for altering the group of digital signals in said register while said switching means is not momentarily translating a group of digital signals.

8. In a digital-to-analog converting system having a register for selectively distributing a group of digital signals to one of a plurality of digital-to-analog converters and a means for coupling output signals from said register in parallel to a selected digital-to-analog converter, each digital-to-analog converter having a plurality of bistable relay circuits, each bistable relay circuit being operatively associated with a given digital signal of a group of digital signals, each of which is assigned a different order of value, said operative association being such that each corresponding relay circuit may be energized when its associated digital signal is a voltage signal at a first potential of a given polarity with respect to a reference potential and be de-energized when said associated digital signal is a voltage signal at said reference potential, an output terminal of each bistable relay circuit being connected to a load, each of said bistable relay circuits comprising:

a relay having a coil and a transfer contact operatively associated with first and second contacts, said transfer contact being spring-biased to make an electrical connection with said first contact when said coil is de-energized;

means for connecting a first terminal of said coil to a source of reference potential;

means for connecting to said first contact a first source of potential of a polarity opposite to said given polarity with respect to said reference potential;

means for connecting to said second contact a second source of potential of said given polarity;

a resistor for coupling said transfer contact to said output terminal;

means for momentarily translating a digital signal to a second terminal of said coil; means for electrically coupling said transfer contact to said second terminal of said coil, said means including a unidirectional current-conducting device so poled as to permit current to flow through it to said coil when said coil is energized, whereby said coil remains energized after a digital signal at said first potential is translated to said second terminal of said coil, and to prevent current from flowing through it to said coil when said coil is de-energized, whereby said coil remains de-energized, whereby said coil remains energized after tential is translated to said second terminal of said coil.

9. In a digital-to-analog converting system the combination as defined in claim 8, wherein the resistance of said resistor of said given bistable relay circuit is proportional to the order of the digital signal with which it is operatively assocated.

10. In a digital-to-analog converting system the combination as defined in claim 9, further including a means for altering the group of digital signals in said register while said switching means is not momentarily translating a group of digital signals.

References Cited by the Examiner

UNITED STATES PATENTS

| | | | |
|---|---|---|---|
| 2,848,709 | 8/58 | Jansky | 340—347 |
| 2,970,309 | 1/61 | Towles | 340—347 |

MALCOLM A. MORRISON, *Primary Examiner.*